No. 652,740. Patented July 3, 1900.
I. BECK.
FRUIT OR VEGETABLE CUTTER.
(Application filed Nov. 1, 1898.)

(No Model.) 2 Sheets—Sheet 1.

Witnesses
Inventor
Israel Beck,
by H. B. Willson & Co.
Attorneys

No. 652,740. Patented July 3, 1900.
I. BECK.
FRUIT OR VEGETABLE CUTTER.
(Application filed Nov. 1, 1898.)

(No Model.) 2 Sheets—Sheet 2.

Witnesses Inventor
Israel Beck
by H. B. Wilson & Co.
Attorneys

UNITED STATES PATENT OFFICE.

ISRAEL BECK, OF PHILIPSBURG, PENNSYLVANIA, ASSIGNOR OF TWO-THIRDS TO HARRY J. BECK AND MAC. R. THOMPSON, OF SAME PLACE.

FRUIT OR VEGETABLE CUTTER.

SPECIFICATION forming part of Letters Patent No. 652,740, dated July 3, 1900.

Application filed November 1, 1898. Serial No. 695,199. (No model.)

*To all whom it may concern:*

Be it known that I, ISRAEL BECK, a citizen of the United States, residing at Philipsburg, in the county of Centre and State of Pennsylvania, have invented certain new and useful Improvements in Fruit or Vegetable Cutters; and I do declare the following to be a full, clear, and exact description of the invention, such as will enable others skilled in the art to which it appertains to make and use the same.

The invention relates to fruit and vegetable cutters.

The object of the invention is to provide a simple, durable, and inexpensive machine of this character which may be easily adjusted to vary the thickness of the slices and the parts of which may be easily separated and taken apart for cleaning and repairing.
To this end the invention consists in certain features of construction and combination of parts, which will be hereinafter fully described and claimed.

Figure 1:
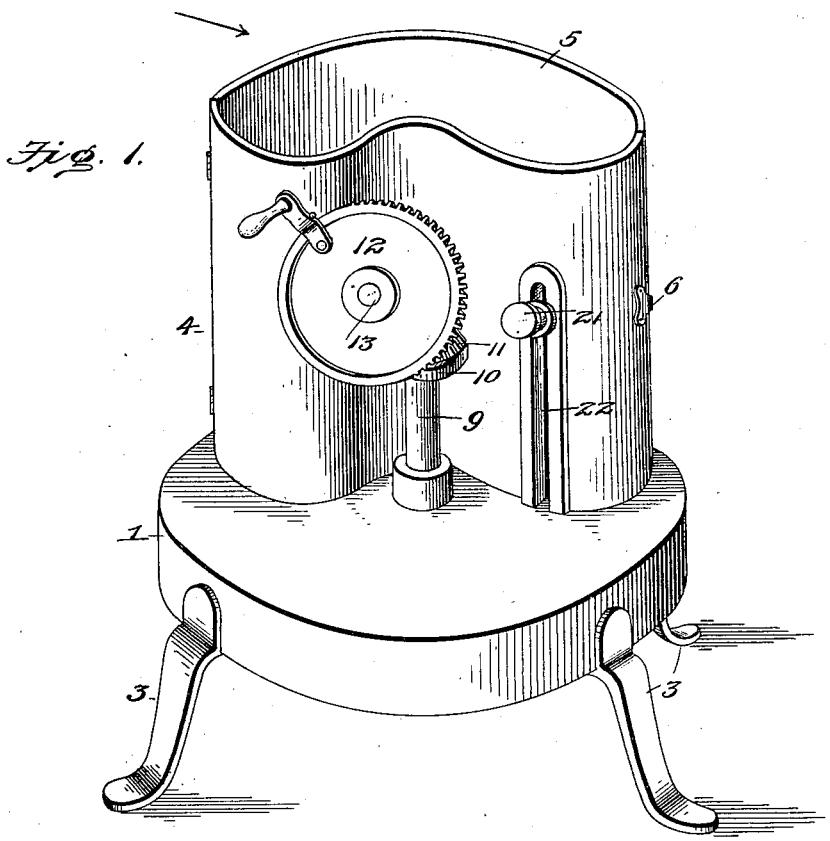
Figure 4:
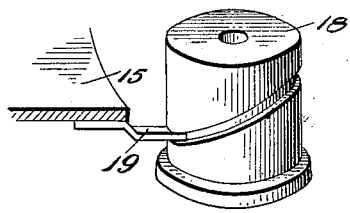
Figure 5:
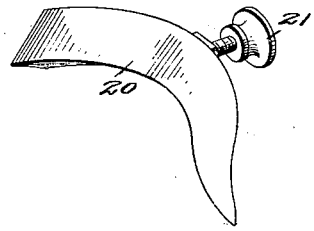
Figure 2:
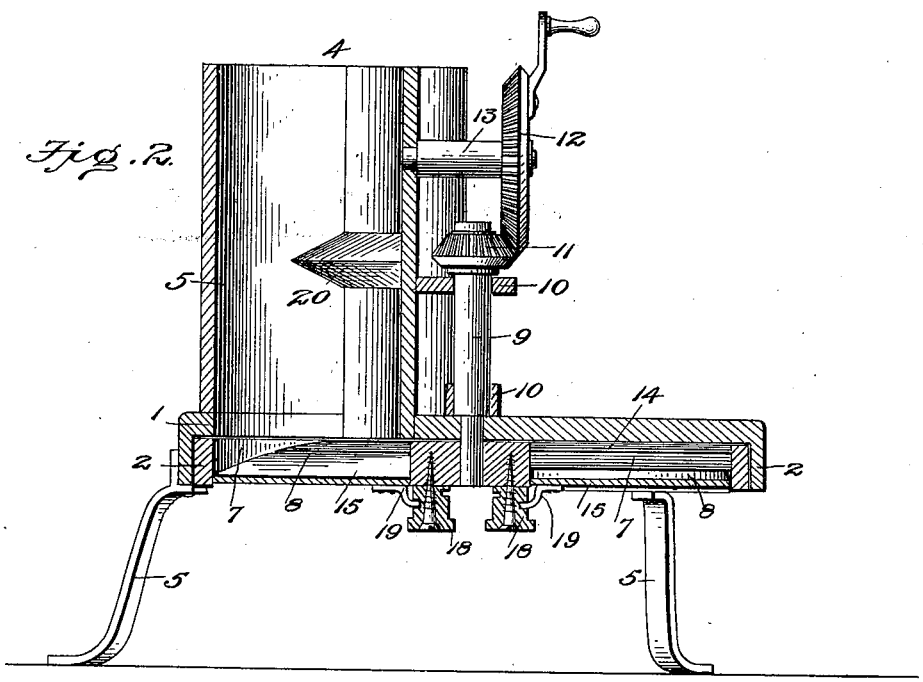
Figure 3:
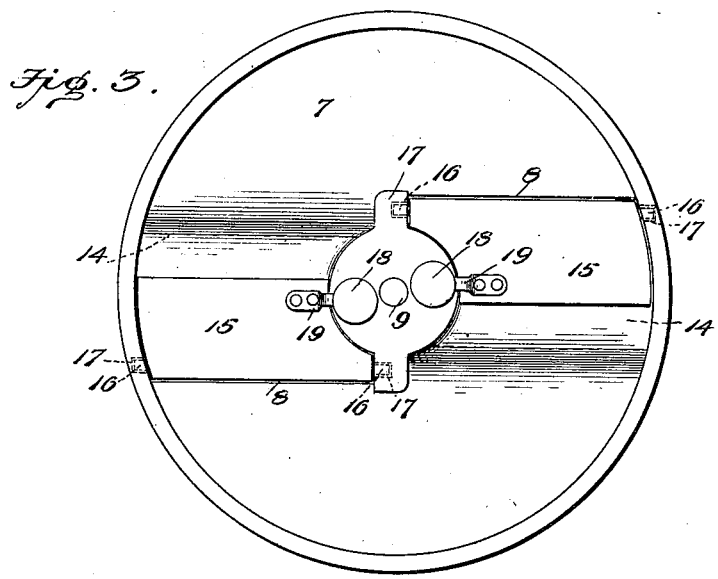

In the accompanying drawings, Figure 1 is a perspective view of the improved vegetable and fruit cutter. Fig. 2 is a central vertical sectional view looking in the direction of the arrow. Fig. 3 is a bottom plan view of the cutter-disk and hinged throats. Fig. 4 is a detail perspective view of the adjusting-cam. Fig. 5 is a similar view of the feed-block.

In the drawings the same reference characters indicate the same parts of the invention.
1 denotes the base of the machine, which is provided with a downwardly-projecting flange 2 and supporting-legs 3.

4 denotes the hopper, supported above said base 1, the part 5 of the hopper being hinged to the other part and secured by a fastener 6.

7 indicates a rotary cutter-disk having radial openings 8. 9 indicates a vertical shaft, to the lower end of which the cutter-disk is secured. This shaft projects upwardly through the circular base and is journaled in bearings 10, secured to the hopper and is provided with a beveled gear 11, which is driven by a similar gear 12, journaled in a post 13, secured to the hopper.
14 denotes cutter-blades secured to the edges of the radial openings in the cutter-disk, and 15 denotes adjustable throat-pieces having trunnions 16 journaled in bearings 17, formed in the cutter-disk. These throat-pieces are made adjustable to vary the thickness of slices, and I prefer to employ the following means for effecting this adjustment.

18 denotes the adjusting-cams, which are journaled or swiveled to the disk and provided with a groove, into which projects a lip 19, secured to each throat-piece.

It is evident that by partially rotating the adjusting-cams the throat-pieces will be raised or lowered, according to the direction of movement of said cams, and if it is desired to remove the throat-pieces in order to sharpen the cutter-blades or for cleaning the machine the adjusting-cam is turned until its square portion is opposite the lip, which will free the lip from the groove, so that the throat-piece may be easily removed.

In slicing potatoes or other articles oval or round in form it is difficult to hold them sufficiently firm to enable the cutters to perform their work satisfactorily unless spring-plungers or devices of a similar nature are employed. These plungers or devices are objectionable for the reason that after the hopper has been filled with vegetables to be cut and the plungers arranged at the upper end of the hopper to force the vegetables to the cutters it will be impossible to feed or refill the hopper unless the plungers be removed or lifted out of the hopper. To overcome this objection and to provide means that will hold the vegetables firmly while being sliced is the gist of the present invention. This means comprises a block 20, V-shaped in cross-section to provide beveled upper and lower sides.
A set-screw 21 extends through a longitudinal slot 22 in the hopper and engages the block and enables it to be adjusted vertically to adapt the machine to the cutting of different kinds of vegetables or fruits—that is to say, large or small. When the articles to be sliced are placed in the hopper and the disk rotated, the articles will be forced under the lower inclined edge of the feed-block and become wedged firmly in place to be acted upon by the knives. After several slices have been cut and the article lies flat upon the disk there is no difficulty experienced to complete the slicing of the article. The great difficulty in this class of machines is to make the initial slices, as articles oval or round in form tend to bounce or jump upwardly as the knives strike them. The upper side of the feed-block is inclined downwardly to prevent the articles lodging thereon.

Having thus described the invention, what is claimed, and desired to be secured by Letters Patent, is—

In a fruit and vegetable cutter, the combination with the main frame and a hopper mounted thereon; of a rotary cutter-disk provided with cutter-blades, a feed-block having its rear face conforming to the contour of the inner periphery of said hopper and resting against said inner periphery when held in place and formed substantially V-shaped in cross-section to form a holding edge, a screw and thumb-nut for securing said feed-block adjustably in place, said screw being vertically adjustable in a vertical slot 22 formed in said hopper, the adjusting-cams 18 18 journaled or swiveled to the cutter-disk, and each cam 18 18 being provided with a groove, and the lips 19 19 secured to the adjustable throat-plate 15 and projecting into the grooves in said adjusting-cams 18 18, substantially as specified.

In testimony whereof I have hereunto set my hand in presence of two subscribing witnesses.

ISRAEL BECK.

Witnesses:
M. G. POTTSGROVE,
F. G. REGESTER.